United States Patent
Jang et al.

(10) Patent No.: US 10,555,327 B2
(45) Date of Patent: Feb. 4, 2020

(54) METHOD AND APPARATUS FOR TRANSMITTING DATA IN WIRELESS COMMUNICATION SYSTEM SUPPORTING CARRIER AGGREGATION

(71) Applicant: Samsung Electronics Co., Ltd., Suwon-si, Gyeonggi-do (KR)

(72) Inventors: Chulhee Jang, Seoul (KR); Eunyong Kim, Yongin-si (KR); Eunhyun Kwon, Seoul (KR); Seungjoo Maeng, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/774,102

(22) PCT Filed: Nov. 11, 2016

(86) PCT No.: PCT/KR2016/012997
§ 371 (c)(1),
(2) Date: May 7, 2018

(87) PCT Pub. No.: WO2017/086660
PCT Pub. Date: May 26, 2017

(65) Prior Publication Data
US 2018/0317240 A1    Nov. 1, 2018

(30) Foreign Application Priority Data
Nov. 19, 2015   (KR) .................. 10-2015-0162456

(51) Int. Cl.
*H04W 72/12*   (2009.01)
*H04W 88/08*   (2009.01)
(Continued)

(52) U.S. Cl.
CPC .......... *H04W 72/12* (2013.01); *H04L 1/1854* (2013.01); *H04L 5/001* (2013.01);
(Continued)

(58) Field of Classification Search
CPC ..... H04W 36/08; H04W 28/08; H04W 92/10; H04W 92/20; H04W 36/22; H04W 36/28;
(Continued)

(56) References Cited

U.S. PATENT DOCUMENTS

| 2013/0176988 A1* | 7/2013 | Wang ................... H04W 28/08 370/331 |
| 2014/0204771 A1* | 7/2014 | Gao ..................... H04W 36/28 370/252 |

(Continued)

FOREIGN PATENT DOCUMENTS

| KR | 10-2015-0012654 A | 2/2015 |
| WO | 2015-005741 A1 | 1/2015 |

(Continued)

OTHER PUBLICATIONS

European Search Report dated Aug. 8, 2018, issued in European Application No. 16866612.1-1215 / 3340720.

*Primary Examiner* — Jung Liu
(74) *Attorney, Agent, or Firm* — Jefferson IP Law, LLP

(57) ABSTRACT

The present invention relates to a method for transmitting data by a base station in a wireless communication system supporting carrier aggregation, comprising the steps of: confirming whether a condition for data transmission distribution is satisfied; if the condition is satisfied, determining respective radio link control (RLC) data to be allocated to the base station and another base station, and sequence numbers for the RLC data; and transmitting the RLC data allocated to the other base station and the sequence numbers.

(Continued)

However, the present invention is not limited to the embodiment above and other embodiments are possible.

15 Claims, 14 Drawing Sheets

(51) Int. Cl.
*H04L 1/18* (2006.01)
*H04L 5/00* (2006.01)
*H04W 72/04* (2009.01)
*H04L 1/00* (2006.01)

(52) U.S. Cl.
CPC ....... *H04W 72/0446* (2013.01); *H04W 88/08* (2013.01); *H04L 2001/0097* (2013.01)

(58) Field of Classification Search
CPC ............. H04W 36/30; H04W 36/0069; H04W 84/045; H04L 5/0053; H04L 61/2007; H04L 5/0007; H04L 5/0091; H04B 7/15592; H04B 7/022; H04B 7/15
See application file for complete search history.

(56) References Cited

U.S. PATENT DOCUMENTS

| | | | |
|---|---|---|---|
| 2015/0043435 A1* | 2/2015 | Blankenship | H04L 69/322 370/329 |
| 2016/0165628 A1* | 6/2016 | Huh | H04W 72/1268 370/336 |
| 2016/0219475 A1* | 7/2016 | Kim | H04L 5/00 |
| 2017/0078918 A1* | 3/2017 | He | H04W 28/02 |

FOREIGN PATENT DOCUMENTS

| | | |
|---|---|---|
| WO | 2015002466 A2 | 1/2015 |
| WO | 2015123939 A1 | 8/2015 |
| WO | 2015-167546 A1 | 11/2015 |

* cited by examiner

METHOD AND APPARATUS FOR TRANSMITTING DATA IN WIRELESS COMMUNICATION SYSTEM SUPPORTING CARRIER AGGREGATION

TECHNICAL FIELD

The present invention relates to a wireless communication system supporting carrier aggregation and, in particular, to a method and apparatus for transmitting data to a terminal over multiple carriers.

BACKGROUND ART

The mobile communication system has been developed for the user to communicate on the move. With the rapid advance of technologies, the mobile communication system has evolved to the level capable of providing high speed data communication services as well as a voice telephony service.

Recently, standardization for a long-term evolution (LTE) system, as one of the next-generation mobile communication systems, has been underway in the 3rd generation partnership project (3GPP). LTE is a technology for realizing high-speed packet-based communications at a data rate of up to 100 Mbps, which is higher than the currently available data rate, and its standardization is almost complete.

For improving data rates, recent studies are focused on LTE-Advanced (LTE-A) with the adoption of various new techniques to the legacy LTE system. One of such technologies is Carrier Aggregation. Unlike the conventional technology of using one downlink carrier and one uplink carrier for data communication, Carrier Aggregation is a technology allowing a terminal to use multiple downlink carriers and multiple uplink carriers.

In the case where multiple base stations transmit data over aggregated frequency resources, however, inter-base station latencies may cause data transmission resource waste.

DISCLOSURE OF INVENTION

Technical Problem

The present invention has been conceived to solve at least part of the above problem and aims to provide a method and apparatus for distributing, in advance, data and sequence numbers for the corresponding data to protect against data transmission resource waste caused by latencies among the base stations that transmit the data over aggregated frequency resources.

Solution to Problem

In accordance with an aspect of the present invention, a data transmission method of a base station in a wireless communication system supporting carrier aggregation includes identifying whether a condition for assigning data to be transmitted is fulfilled; determining, if the condition is fulfilled, radio link control (RLC) data to be assigned to the base station and any other base station and sequence numbers associated with the RLC data; and transferring the RLC data and sequence numbers assigned to the any other base station.

In accordance with another aspect of the present invention, a data transmission method of a base station in a wireless communication system supporting carrier aggregation includes receiving, if a condition for assigning data to be transmitted is fulfilled, radio link control (RLC) data assigned to the base station and sequence numbers associated with the RLC data from any other base station; and performing terminal scheduling based on the received RLC data and sequence numbers.

In accordance with another aspect of the present invention, a base station of a wireless communication system supporting carrier aggregation includes a communication unit configured to transmit and receive signals and a controller configured to control to identify whether a condition for assigning data to be transmitted is fulfilled; determine, if the condition is fulfilled, radio link control (RLC) data to be assigned to the base station and any other base station and sequence numbers associated with the RLC data; and transfer the RLC data and sequence numbers assigned to the any other base station.

In accordance with still another aspect of the present invention, a base station of a wireless communication system supporting carrier aggregation includes a communication unit configured to transmit and receive signals and a controller configured to control to receive, if a condition for assigning data to be transmitted is fulfilled, radio link control (RLC) data assigned to the base station and sequence numbers associated with the RLC data from any other base station and perform terminal scheduling based on the received RLC data and sequence numbers.

Advantageous Effects of Invention

The present invention is advantageous in terms of improving network resource utilization efficiency, when multiple base stations transmit data over aggregated frequency resources, by assigning data and sequence numbers for the corresponding data among the base stations.

MODE FOR THE INVENTION

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Although the description is directed to the advanced E-UTRA (or LTE-A) supporting carrier aggregation, it will be understood by those skilled in the art that the subject matter of the present invention can be applied also to other communication systems having a similar technical background and channel format, with a slight modification, without departing from the spirit and scope of the present invention. For example, the subject matter of the present invention is applicable to the multicarrier HSPA supporting carrier aggregation.

The embodiments disclosed in the specification and drawings are proposed to help explain and understand the present invention rather than to limit the scope of the present invention. It is obvious to those skilled in the art that various modifications and changes can be made thereto without departing from the broader spirit and scope of the invention.

Various embodiments of the present invention relate to method and apparatuses for carrier aggregation (CA) among multiple base stations and are directed to downlink data transmission in a wireless communication system.

According to various embodiments, CA may include all the types of frequency resource aggregation techniques including Rel-12 dual connectivity (DC), Rel-12 TDD-FDD CA, Rel-13 licensed assisted access (LAA), TDD-FDD dual connectivity, LTE-U supplement downlink (SDL), LTE-U CA, LTE-WLAN aggregation, and LTE-Wi-Fi aggregation, as well as Rel-10 CA of 3GPP LTE standard.

Figure 1:
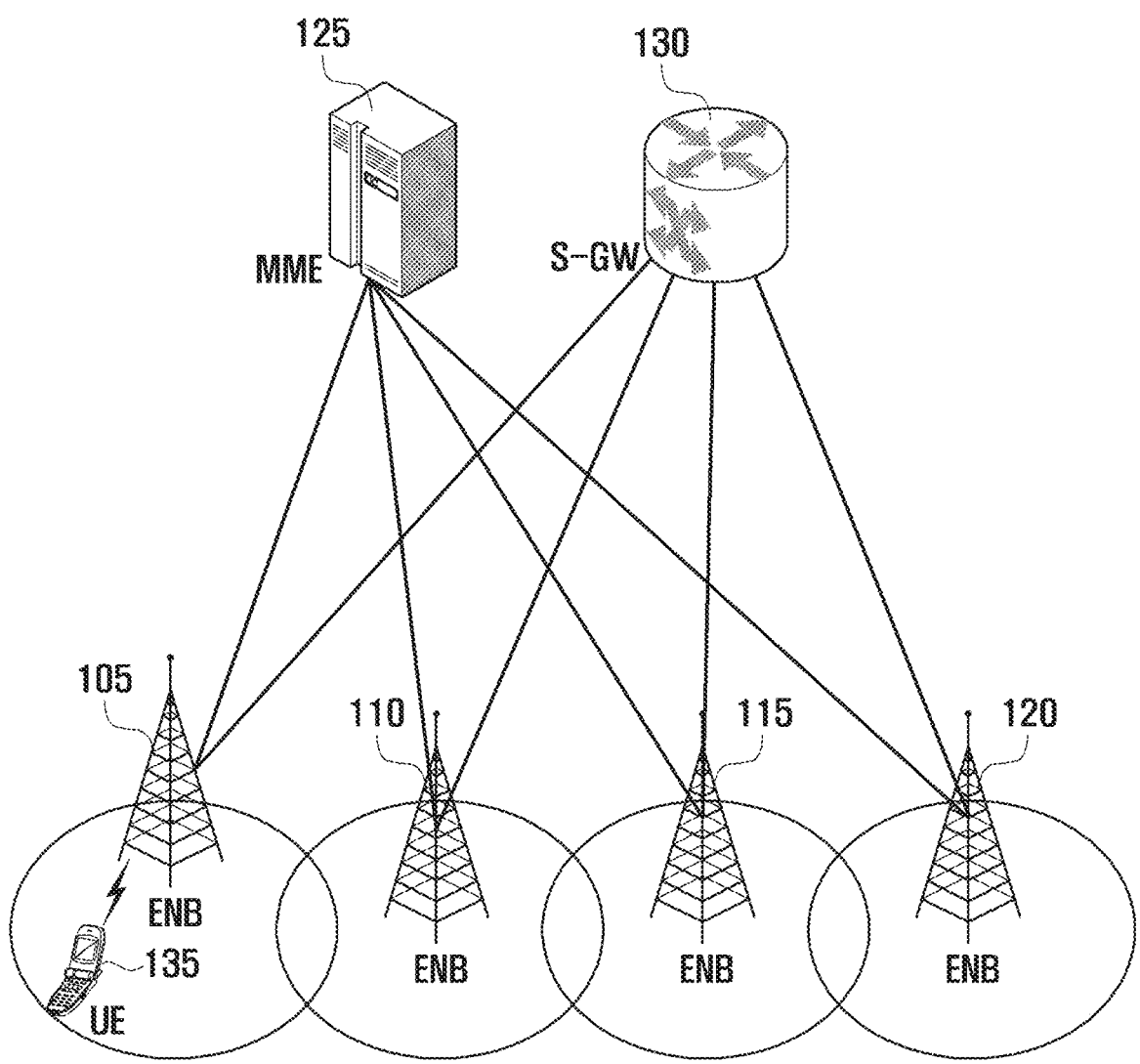
FIG. 1 is a schematic diagram illustrating architecture of an LTE system.

FIG. 1 is a schematic diagram illustrating architecture of an LTE system.

In reference to FIG. 1, the radio access network of the LTE system includes evolved node Bs (hereinafter, interchangeably referred to as eNB, node B, and base station) 105, 110, 115, and 120, a mobility management entity (MME) 125, and a serving-gateway (S-GW) 130. The user equipment (hereinafter, interchangeably referred to as UE and terminal) 135 connects to an external network via the eNBs 105, 110, 115, and 120 and the S-GW 130.

In FIG. 1, the eNBs 105, 110, 115, and 120 correspond to legacy node Bs of a UMTS system. The UE 135 connects to eNBs 105, 110, 115, and 120 through a radio channel, and the eNBs 105, 110, 115, and 120 have functions more complex than those of the legacy node B. In the LTE system where all user traffic including real time services such as Voice over IP (VoIP) is served through shared channels, it is necessary to schedule UEs based on scheduling information such as buffer status, power headroom status, and channel status collected from the UEs, and an eNB serving the UEs takes charge of this function. Typically, one eNB operates multiple cells. The LTE system adopts orthogonal frequency division multiplexing (OFDM) as a radio access technology to secure a data rate of up to 100 Mbps in a bandwidth of 20 MHz. The LTE system also adopts Adaptive Modulation and Coding (AMC) to determine the modulation scheme and channel coding rate in adaptation to the channel condition of the UE.

The S-GW 130 handles data bearer functions to establish and release data bearers under the control of the MME 125.

The MME 125 handles various control functions as well as the mobile management function and has connections with the eNBs.

Figure 2:
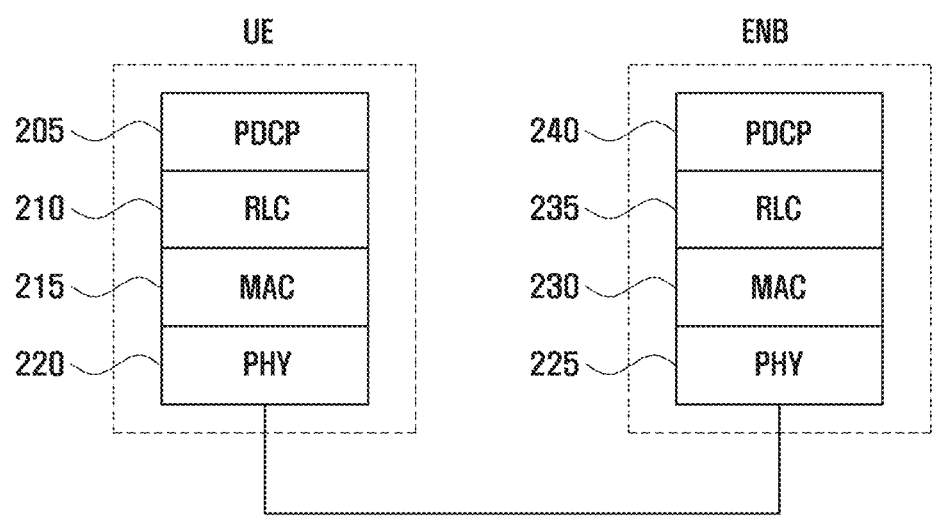
FIG. 2 is a diagram illustrating a protocol stack for use in an LTE system.

FIG. 2 is a diagram illustrating a protocol stack for use in a LTE system.

In reference to FIG. 2, the protocol stack of the interface between the UE and the eNB in the LTE system includes a physical layer denoted by reference numbers 220 and 225, medium access control (MAC) layer denoted by reference numbers 215 and 230, radio link control (RLC) layer denoted by reference numbers 210 and 235, and packet data convergence control (PDCP) layer denoted by reference numbers 205 and 240.

The PDCP layer denoted by reference numbers 205 and 240 takes charge of compressing/decompressing an IP header.

The RLC layer denoted by reference numbers 210 and 235 takes charge of reformatting PDCP packet data units (PDUs) for ARQ operation.

The MAC layer denoted by reference number 215 and 230 allows for connection of multiple RLC entities established for one UE and takes charge of multiplexing RLC PDUs from the RLC layer into a MAC PDU and demultiplexing a MAC PDU into RLC PDUs.

The PHY layer denoted by reference numbers 220 and 225 takes charge of channel-coding and modulation on higher layer data to generate and transmit OFDM symbols over a radio channel and demodulating and channel-decoding on OFDM symbols received over the radio channel to deliver the decoded data to the higher layers.

A schematic description is made of the 3GPP LTE Rel-10 CA technique hereinafter.

In Rel-10 CA, the UE may have frequency specific-cells including a primary cell (PCell), which uniquely allows for an RRC connection, and other cells called secondary cells (SCells). When CA is configured, multi-frequency characteristics are observed at the MAC/PHY/RF layer but are transparent to the higher layers above the MAC layer in view of the downlink (DL) layer-2 structure. That is, the PDCP and RLC layer entities are established regardless of the number of carriers, while as many of the MAC/PHY/RF layer entities are established as the number of carriers.

If the Rel-10 CA technique is applied to different eNBs (e.g., PCell and SCells are hosted by different eNBs), it may be assumed that the individual eNBs use the RLC located at the eNB hosting the PCell. Here, since the MAC/PHY entities associated with the RLC entity are located at different eNBs, there is a need of signal exchange between the eNB hosting the PCell and the eNBs hosting the SCells according to the RLC/MAC/PHY processing procedure. In this case, there are likely to be several types of latency including X2 delay among the eNBs, which cause degradation of data transmission efficiency.

The present invention proposes a method for utilizing network resources efficiently through inter-eNB frequency resource aggregation, and this is explained in various embodiments.

The methods and apparatus explained in the various embodiments of the present invention may be applied for utilizing SCell resources efficiently in the Rel-10 CA-based inter-eNB frequency resource aggregation and other inter-eNB frequency resource aggregation techniques including Rel-12 DC-based inter-eNB frequency resource aggregation.

According to an embodiment of the present invention, an eNB has a virtual RLC to support inter-eNB frequency aggregation.

An embodiment of the present invention is directed to an algorithm for assigning data to different eNBs in advance to support inter-eNB carrier aggregation.

In the following descriptions, the terms "primary eNB" and "secondary eNB" are used; the term "eNB" denotes a device that communicates with UEs and controls the operations of the UEs, and it may be assumed that the first eNB establishes an RRC connection. That is, an eNB hosting a PCell is referred to as a primary eNB, and an eNB hosting an SCell is referred to as secondary eNB. There exists only one primary eNB per bearer and one or more secondary eNBs. It is not essential for an eNB to host only one cell, i.e., the eNB may host multiple cells with respective frequencies.

The present invention is applicable to all the types of frequency resource aggregation techniques, e.g., Rel-10 CA by substituting the terms "PCell" and "SCell" for the terms "primary eNB" and "secondary eNB," respectively, and Rel-12 DC by substituting the terms "MeNB" and "SeNB" for the terms "primary eNB" and "secondary eNB," respectively.

In the legacy Rel-10 CA technique, even the data to be transmitted to the UE via the secondary eNBs without a PCell are stored in an RLC located in the primary eNB, and MAC PDUs carrying SCell downlink data are generated by the corresponding RLC.

Figure 3:
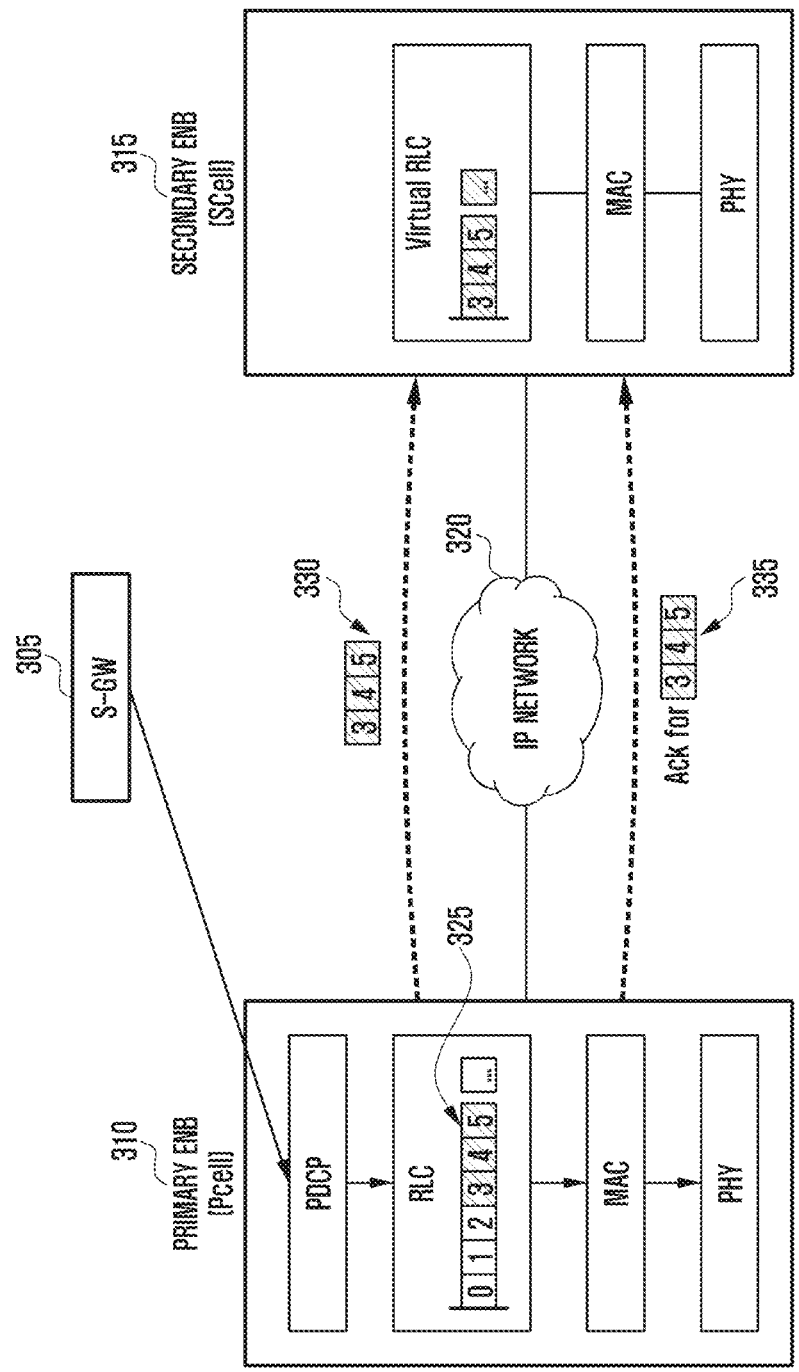
FIG. 3 is a conceptual diagram illustrating an inter-eNB frequency resource allocation procedure according to an embodiment of the present invention.

In the present invention, however, the SCell downlink data may be stored in a virtual RLC entity located in the secondary eNB, in advance, according to a data pre-assignment algorithm. The MAC PDUs carrying the SCell downlink data may be generated by the virtual RLC. This may allow the inter-eNB latency caused by delivery of SCell resource allocation result, RLC sequence number (SN), and MAC PDUs to be cancelled. However, the ACK/NACK that is transmitted only through the PCell should be transferred from the PCell to the SCell. FIG. 3 is a conceptual diagram illustrating an inter-eNB frequency resource allocation procedure according to an embodiment of the present invention.

The primary eNB 310 and the secondary eNB 315 are connected to each other through a wireless or wired network 320 to exchange signals. The S-GW 305 establishes a data bearer with the primary eNB 310 hosting the PCell.

The RLC of the primary eNB 310 assigns downlink RLC data to the primary and secondary eNBs 310 and 320 along with RLC SNs as denoted by reference number 325. The RLC entity of the primary eNB 310 sends the RLC data and corresponding RLC SNs assigned to the secondary eNB 315 to the virtual RLC of the secondary eNB 315. Also, the RLC of the primary eNB 310 sends ACK/NACK corresponding to the SCell downlink data to the virtual RLC 335.

Figure 4:
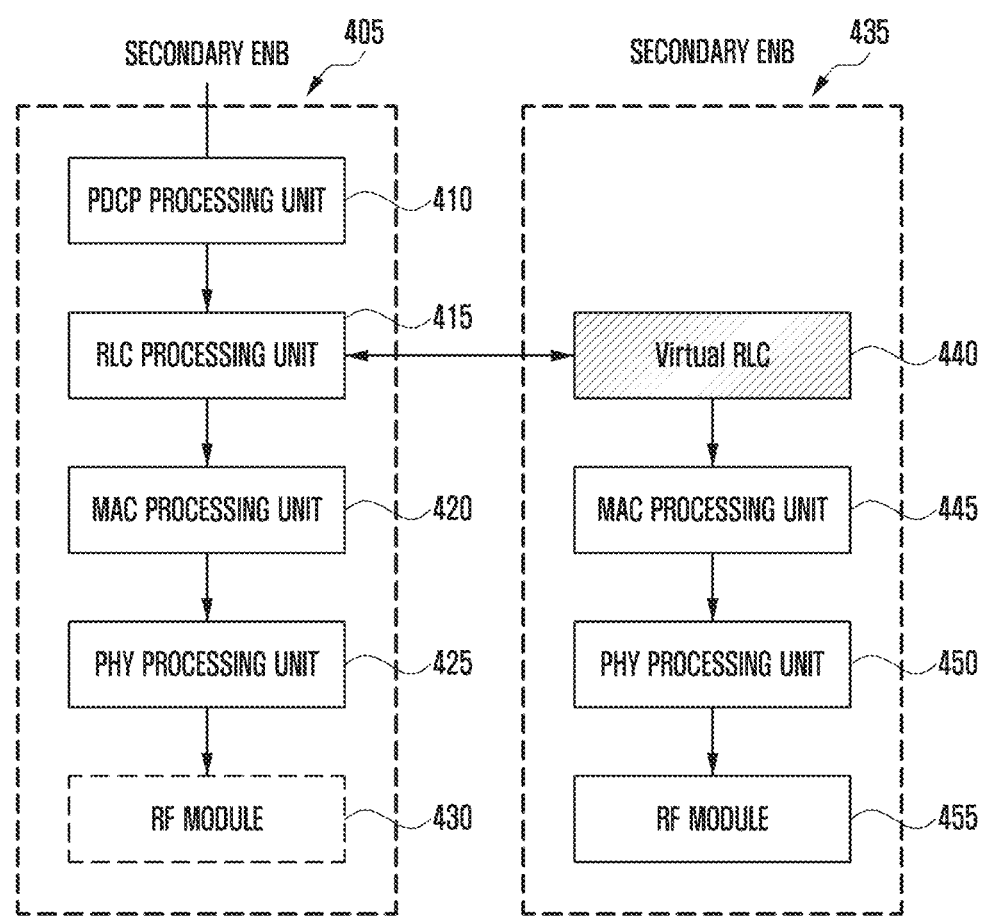
FIG. 4 is a diagram illustrating schematic configurations of a primary eNB and a secondary eNB according to an embodiment of the present invention.

FIG. 4 is a diagram illustrating schematic configurations of a primary eNB and a secondary eNB according to an embodiment of the present invention. According to this embodiment, there may be multiple secondary eNBs hosting respective SCells and, in this case, the secondary eNBs are referred to as first secondary eNB, second secondary eNB, . . . , and Nth secondary eNB that are collectively called secondary eNBs.

Each of the primary and secondary eNBs 405 and 435 may include a communication unit for communicating signals and a controller for controlling the communication unit and overall operations to implement the present invention. For example, the communication unit may include an RF module 430 or 455. For example, the controller may include at least one of a PDCP processing unit 410, an RLC processing unit 415, a virtual RLC processing unit 440, a MAC processing unit 420 or 445, and a PHY processing unit 425 or 450. However, the eNBs are not limited to the depicted configuration, and they may be implemented in various configurations.

According to an embodiment of the present invention, the primary eNB 405 may include a PDCP processing unit 410, an RLC processing unit 415, a MAC processing unit 420, a PHY processing unit 425, and an RF module 430.

The PDCP processing unit 410 is responsible for IP header compression/decompression.

The RLC processing unit 415 is responsible for reformatting PDCP PDUs for ARQ operation. According to an embodiment of the present invention, the RLC processing unit 415 may be responsible for a data pre-assignment function for assigning data, in advance, to eNBs in CA mode.

The RLC processing unit 415 may collect and manage information for use in determining whether to perform the data pre-assignment. The RLC processing unit 415 may determine to perform the data pre-assignment based on the information and assign data to the eNBs based on the determination result. The RLC processing unit 415 may send the corresponding eNBs the data along with corresponding RLC SNs.

According to an embodiment of the present invention, the RLC processing unit 415 of the primary eNB 405 may perform the data pre-assignment per radio bearer periodically when there are data to be transmitted to the UE. According to various embodiments of the present invention, the data pre-assignment may be performed by the PDCP processing unit 410.

The information for use in determining whether to perform the data pre-assignment may include at least one of eNB-specific buffer occupancy (BO) size (BOn denotes BO of the nth eNB), latency (dn denotes latency between the first eNB and the nth eNB), and data rate (Tn denotes the data rate from the nth eNB to the UE). Here, n may indicate one of a primary, a first secondary, a second secondary, . . . , and Nth secondary eNBs. The RLC processing unit 415 may determine whether a data pre-assignment condition is satisfied per eNB. In this case, BOn, dn, and Tn are used as shown in formula (1).

$$f(BO_n, d_n, T_n) > 0 \qquad (1)$$

If one or more eNBs meet the data pre-assignment condition, the primary eNB determines the data size (Sn) to be pre-assigned to the eNB and a number of RLC SNs (Rn) to be assigned to the eNB based on BOn, dn, and Tn as shown in formula (2).

$$\{S_1, R_1, \ldots, S_n, R_n\} = g(BO_1, d_1, T_1, \ldots, BO_n, d_n, T_n) \qquad (2)$$

For example, the size of data and the number of SNs to be assigned to an eNB may increase as the BO size of the eNB decreases or the data rate increases; the size of data and the number of RLC SNs to be assigned to an eNB may decrease as the latency with the first eNB increases.

The RLC processing unit 415 may control such that the RLC data and corresponding RLC SNs assigned to the secondary eNB 435 as a result of the data pre-assignment are transmitted to the virtual RLC 440 of the secondary eNB 435.

The MAC processing unit 420 multiplexes RLC PDUs into a MAC PDU and demultiplexes a MAC PDU into RLC PDUs and is responsible for resource allocation.

The PHY processing unit 425 is responsible for channel coding and modulation on higher layer data to generate and transmit OFDM symbols over a radio channel and demodulating and channel decoding on OFDM symbols received over the radio channel to deliver the decoded data to the higher layers.

According to an embodiment of the present invention, the secondary eNB 435 may include a virtual RLC processing unit 440, a MAC processing unit 445, a PHY processing unit 450, and an RF module 455.

The virtual RLC processing unit 440 may perform the RLC functions for the cell hosted by the secondary eNB 435. The virtual RLC processing unit 440 may send the primary eNB the information necessary for use in determining whether to perform data pre-assignment. For example, this information may include at least one of a BO size and data rate of the secondary eNB.

The virtual RLC processing unit 440 may store the RLC data and corresponding RLC SNs transmitted by the RLC processing unit 415 of the primary eNB 405 according to the result of the data pre-assignment. The virtual RLC processing unit 440 may generate MAC PDUs containing downlink data addressed to the UE based on the stored RLC data and corresponding RLC SNs. Here, the RLC SN may be assigned per MAC PDU based on RLC SN information.

The MAC processing unit 445 multiplexes RLC PDUs into a MAC PDU and demultiplexes a MAC PDU into RLC PDUs and is responsible for resource allocation.

The PHY processing unit 450 is responsible for channel-coding and modulation on higher layer data to generate and transmit OFDM symbols over a radio channel and demodulating and channel-decoding on OFDM symbols received over the radio channel to deliver the decoded data to the higher layers.

Figure 5:
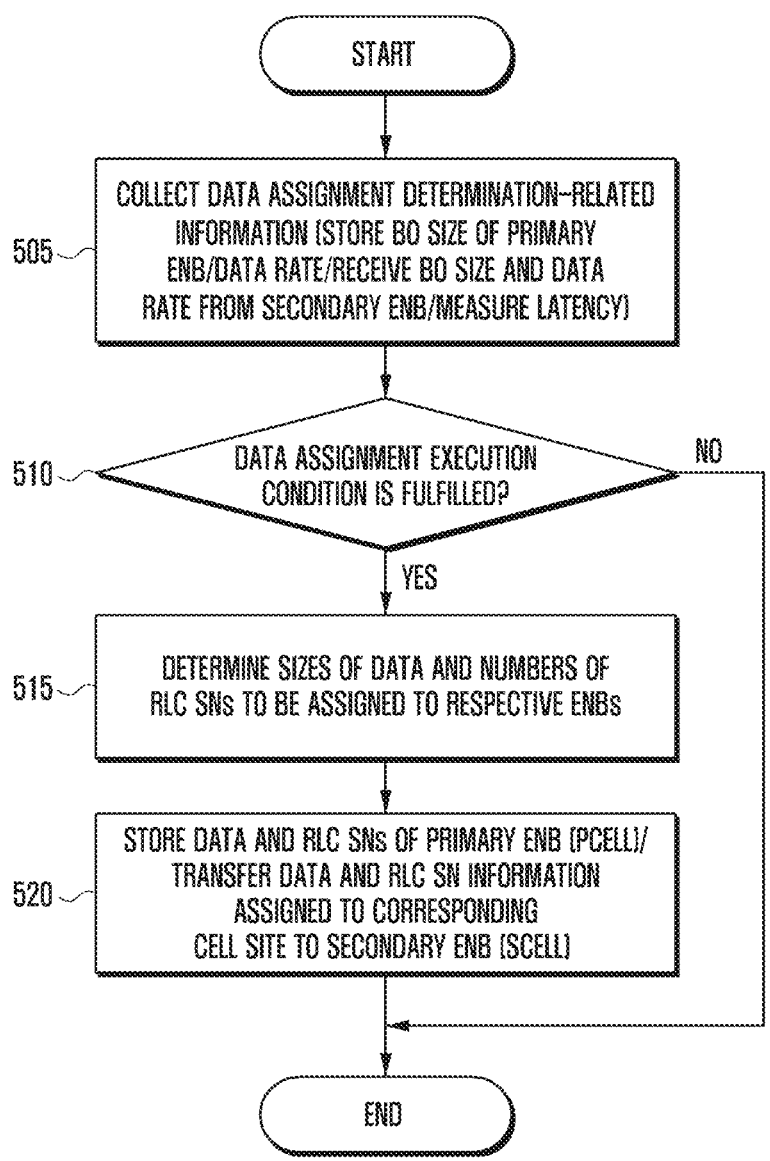
FIG. 5 is a flowchart illustrating a transmission data assignment procedure of a primary eNB hosting the PCell according to an embodiment of the present invention.

FIG. 5 is a flowchart illustrating a transmission data assignment procedure of a primary eNB (e.g., eNB 310 and eNB 405) hosting the PCell according to an embodiment of the present invention. This procedure may be implemented by a controller included in the eNB.

At step 505, the primary eNB may collect related information for determining whether data assignment to a secondary eNB (e.g., eNB 315 and eNB 435) is necessary. As aforementioned, the collected related information may include at least one of BO size, latency in communication with the primary eNB, and data rate per eNB. The primary eNB may store its BO size and data rate and receive the BO size and data rate of the secondary eNB from the secondary eNB. The primary eNB may measure the latency between the primary and secondary eNBs.

At step 510, the primary eNB may determine whether a data assignment execution condition is fulfilled for the secondary eNB based on the collected related information. For example, the primary eNB may determine whether the data assignment execution condition is fulfilled based on formula (1).

If the data assignment execution condition is fulfilled, the primary eNB may determine, at step 515, the data size and number of RLC SNs to be assigned per eNB. The data size and number of RLC SNs to be assigned per eNB may be determined based on equation (2) described above. Accordingly, the RLC SNs may be assigned to the data integrally rather than independently in association with the primary and secondary eNBs. Thus, the UE may receive and arrange the data transmitted by the primary and secondary eNBs based on the integral RLC SNs.

At step 520, the primary eNB may store the data and RLC SNs assigned to the primary eNB and transfer the data and RLC SN assigned to the secondary eNB to the secondary eNB.

Afterward, the primary eNB may send the UE the data assigned to the primary eNB using the RLC SNs assigned to the primary eNB.

Figure 6:
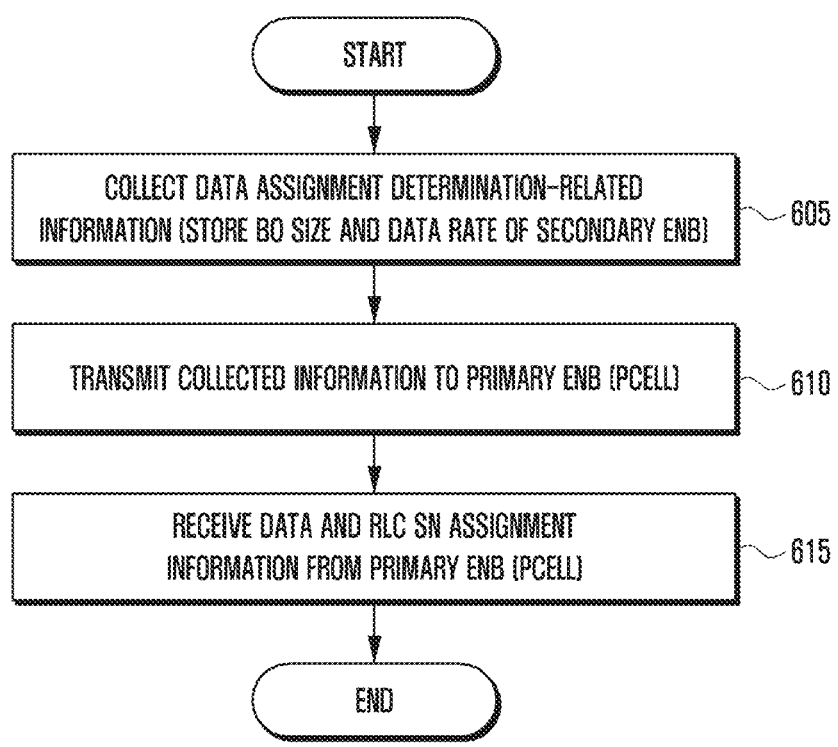
FIG. 6 is a flowchart illustrating a transmission data assignment procedure of a secondary eNB hosting an SCell according to an embodiment of the present invention.

FIG. 6 is a flowchart illustrating a transmission data assignment procedure of a secondary eNB (e.g., eNB 315 and eNB 435) hosting an SCell according to an embodiment of the present invention. This procedure may be implemented by a controller included in the eNB.

At step 605, the secondary eNB may collect related information for determining whether data assignment is necessary. For example, the secondary eNB may store at least one of its BO size and data rate.

At step 610, the secondary eNB may send the collected related information to the primary eNB (e.g., eNB 310 and eNB 405) hosting the PCell.

After the primary eNB assigns data and RLC SNs based on the data assignment determination-related information, the secondary eNB may receive, at step 615, the data assigned to the secondary eNB and RLC SNs from the primary eNB.

Afterward, the secondary eNB may send the UE the data assigned to the secondary eNB using the RLC SNs assigned to the secondary eNB.

Figure 7:
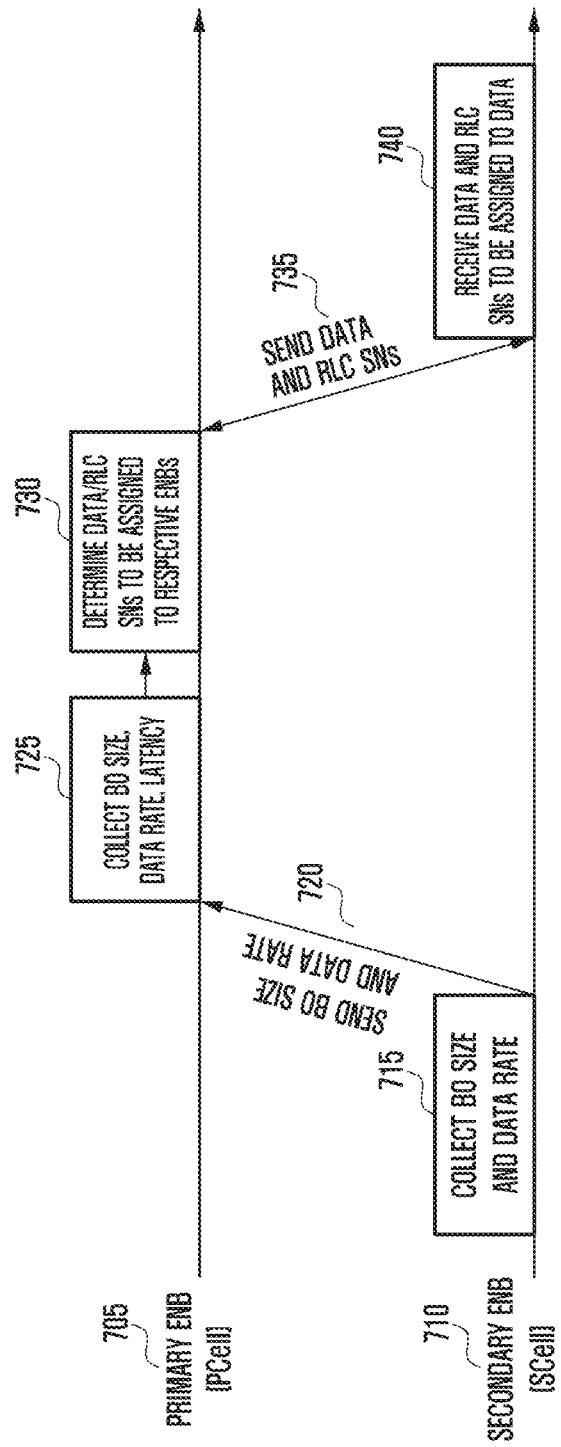
FIG. 7 is a diagram illustrating an operation of assigning transmission data to eNBs according to an embodiment of the present invention.

FIG. 7 is a diagram illustrating an operation of assigning transmission data to eNBs according to an embodiment of the present invention.

At step 715, the secondary eNB 710 hosting an SCell may collect at least one of BO size and data rate of the secondary eNB. At step 720, the secondary eNB 710 may send the primary eNB 705 the collected BO size and data rate.

At step 725, the primary eNB 705 hosting the PCell may collect related information for determining whether data assignment to the eNBs is necessary. For example, the primary eNB 705 may collect at least one of the BO size and data rate of the primary eNB 705 and receive the BO size and data rate of the secondary eNB 710 from the second eNB 710. It may also be possible to measure the latency in communication with the secondary eNB.

At step 730, the primary eNB 705 may determine data and RLC SNs to be assigned to the respective eNBs based on the collected related information. The primary eNB 705 may store the data and RLC SNs assigned to itself. The primary eNB 705 may send the UE the data using the RLC SNs assigned to itself.

At step 735, the primary eNB 705 may send the secondary eNB 710 the data assigned to the secondary eNB 710 and the RLC SNs assigned to the corresponding data.

At step 740, the secondary eNB 710 may receive the data and RLC SN sent by the primary eNB 705. The secondary eNB 710 may send the UE the data assigned to itself using the received RLC SNs.

Figure 8:
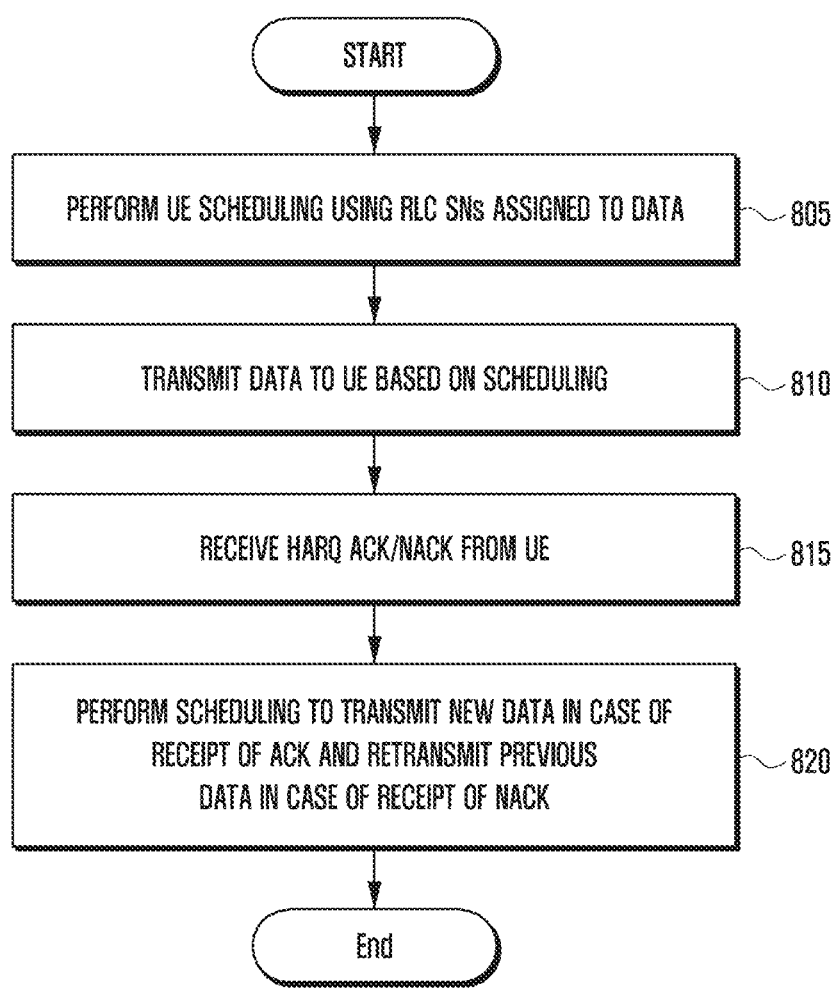
FIG. 8 is a flowchart illustrating a UE scheduling procedure of a primary eNB hosting the PCell according to an embodiment of the present invention.

FIG. 8 is a flowchart illustrating a UE scheduling procedure of a primary eNB (e.g., eNB 310 and eNB 405) hosting the PCell according to an embodiment of the present invention. The procedure depicted in FIG. 8 may be performed subsequent to the procedure depicted in FIG. 5.

At step 805, the primary eNB may perform UE scheduling using the RLC SNs assigned to the data assigned to itself.

At step 810, the primary eNB may send the UE the data based on the scheduling.

At step 815, the primary eNB may receive a HARQ ACK/NACK corresponding to the data from the UE. Since the ACK/NACK corresponding to the data sent through the SCell as well as the ACK/NACK corresponding to the data sent through the PCell are all delivered through the PCell, the primary eNB receives all of the ACK/NACK corresponding to the data assigned to the primary data and the ACK/NACK corresponding to the data assigned to the secondary eNB. The primary eNB may forward the ACK/NACK corresponding to the data assigned to the secondary eNB to the secondary eNB.

At step 820, the primary eNB may perform the UE scheduling to transmit new data for the case of receiving the ACK corresponding to the data transmitted thereby and retransmit the previously transmitted data for the case of receiving the NACK corresponding to the data transmitted thereby.

Figure 9:
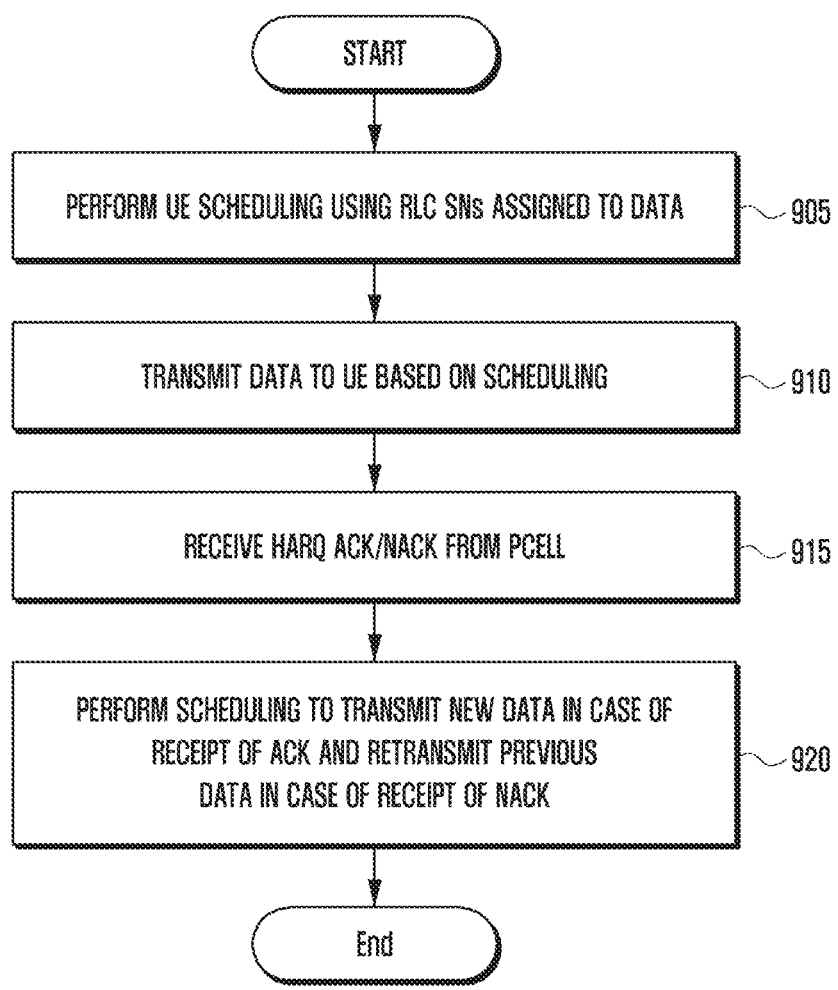
FIG. 9 is a flowchart illustrating a UE scheduling procedure of a secondary eNB hosting an SCell according to an embodiment of the present invention.

FIG. 9 is a flowchart illustrating a UE scheduling procedure of a secondary eNB (e.g., eNB 315 and eNB 435) hosting an SCell according to an embodiment of the present invention. The procedure depicted in FIG. 9 may be performed subsequent to the procedure depicted in FIG. 6.

At step 905, the secondary eNB may perform UE scheduling using the RLC SNs assigned to the data assigned to itself.

At step 910, the secondary eNB may send the data to the UE based on the scheduling.

At step 915, the secondary eNB may receive an HARQ ACK/NACK corresponding to the data from the primary eNB hosting the PCell.

At step 920, the secondary eNB may perform the UE scheduling to transmit new data for the case of receiving the ACK corresponding to the data transmitted by the secondary eNB and retransmit the previously transmitted data for the case of receiving the NACK corresponding to the data transmitted by the secondary eNB.

Figure 10:
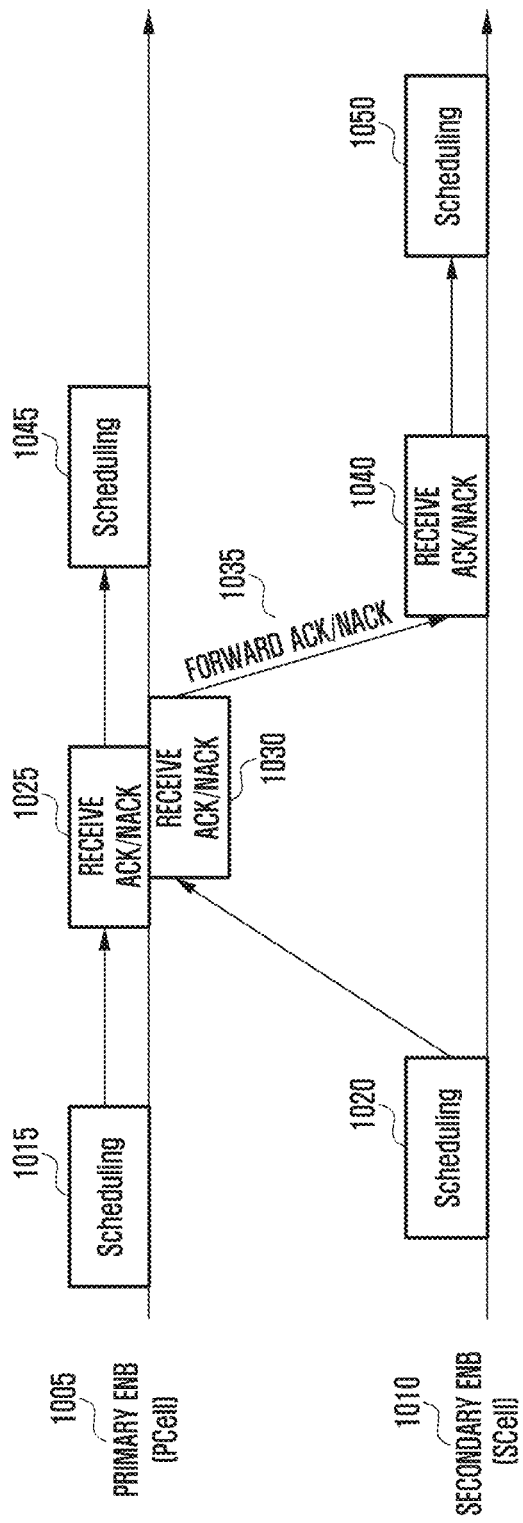
FIG. 10 is a diagram illustrating UE scheduling operations of eNBs according to an embodiment of the present invention.

FIG. 10 is a diagram illustrating UE scheduling operations of eNBs according to an embodiment of the present invention.

At step 1015, the primary eNB 1005 hosting the PCell may perform UE scheduling for sending data assigned to itself. At step 1020, the secondary eNB 1010 hosting an SCell may perform UE scheduling to transmit data assigned to itself.

At step 1025, the primary eNB 1005 may receive an ACK/NACK corresponding to the transmitted data assigned to the primary eNB. At step 1030, the primary eNB 1005 may also receive an ACK/NACK corresponding to the transmitted data assigned to the secondary eNB. This is because all of the ACK/NACKs corresponding to the data transmitted through the PCell and SCell are received through the PCell.

At step 1035, the primary eNB 1005 may send the ACK/NACK corresponding to the transmitted data assigned to the secondary eNB to the secondary eNB 1010. The secondary eNB 1010 may receive the ACK/NACK transmitted by the primary eNB 1005.

Then, the primary eNB 1005 may perform UE scheduling based on the ACK/NACK corresponding to the transmitted data assigned to the primary eNB 1005. For example, the primary eNB 1005 may perform the UE scheduling to transmit new data for the case of receiving the ACK corresponding to the data transmitted thereby and retransmit the previously transmitted data for the case of receiving the NACK corresponding to the data transmitted thereby.

The secondary eNB 1010 may perform UE scheduling based on the ACK/NACK corresponding to the transmitted data assigned to the secondary eNB. For example, the secondary eNB 1010 may perform the UE scheduling to transmit new data for the case of receiving the ACK corresponding to the data transmitted thereby and retransmit the previously transmitted data for the case of receiving the NACK corresponding to the data transmitted thereby.

Figure 11:
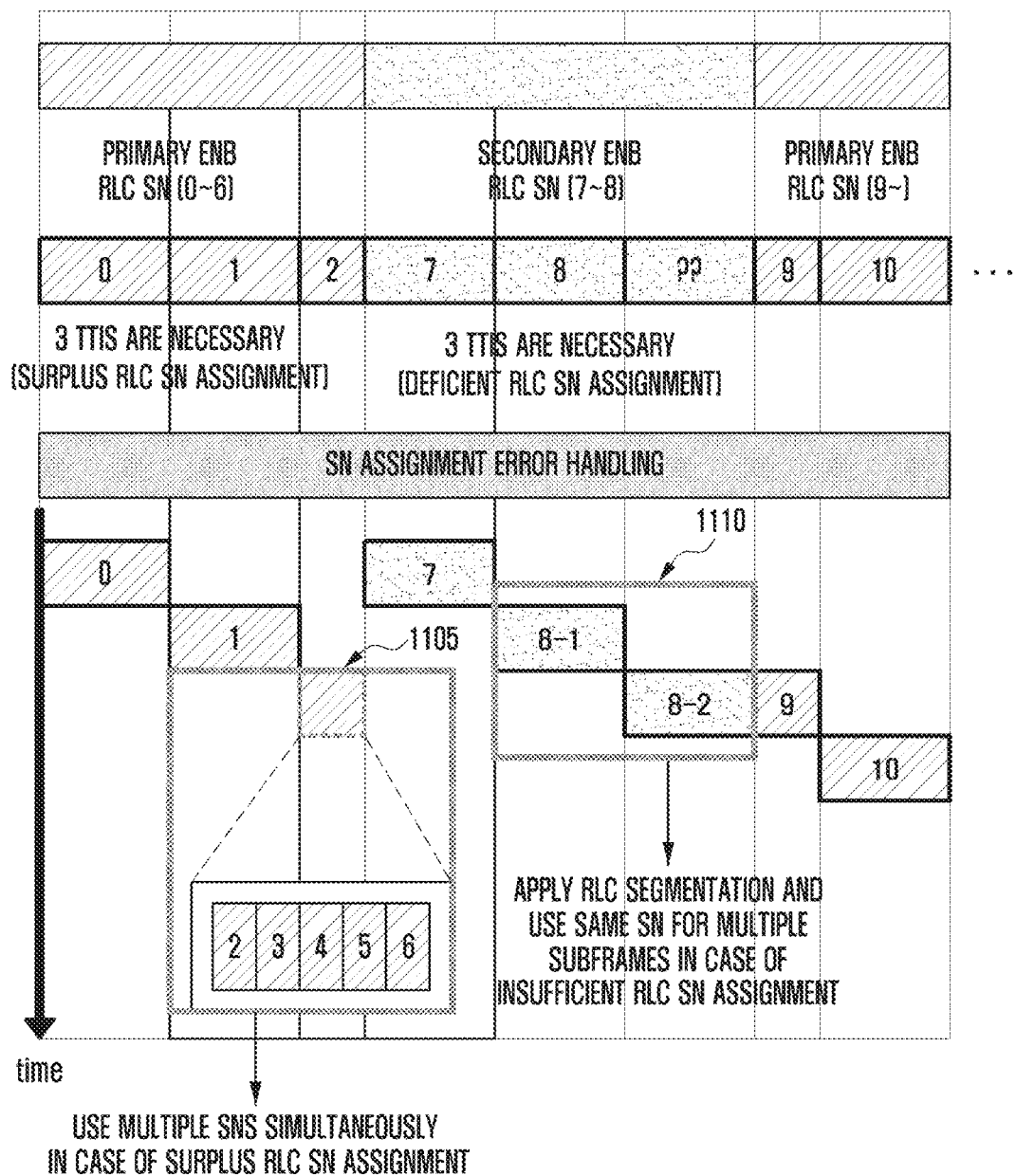
FIG. 11 is a diagram for explaining a scheduling method for handling an RLC SN assignment error according to an embodiment of the present invention.

FIG. 11 is a diagram for explaining a scheduling method for handing an RLC SN assignment error according to an embodiment of the present invention.

According to this embodiment, when there is a failure to predict accurately the number of RLC SNs to be assigned to each eNB (e.g., primary eNB or secondary eNB) for use in transmitting data to the UE, assigned RLC SNs may become surplus or lacking for the allocated resources.

The eNB may assign multiple SNs to one subframe as denoted by reference number 1105 for the case where the RLC SNs are surplus or perform RLC segmentation to assign an SN to multiple subframes as denoted by reference number 1110 for the case where the RLC SNs are lacking.

Figure 12A:
FIG. 12A is a diagram illustrating HARQ process timings in an LTE system.
Figure 12B:
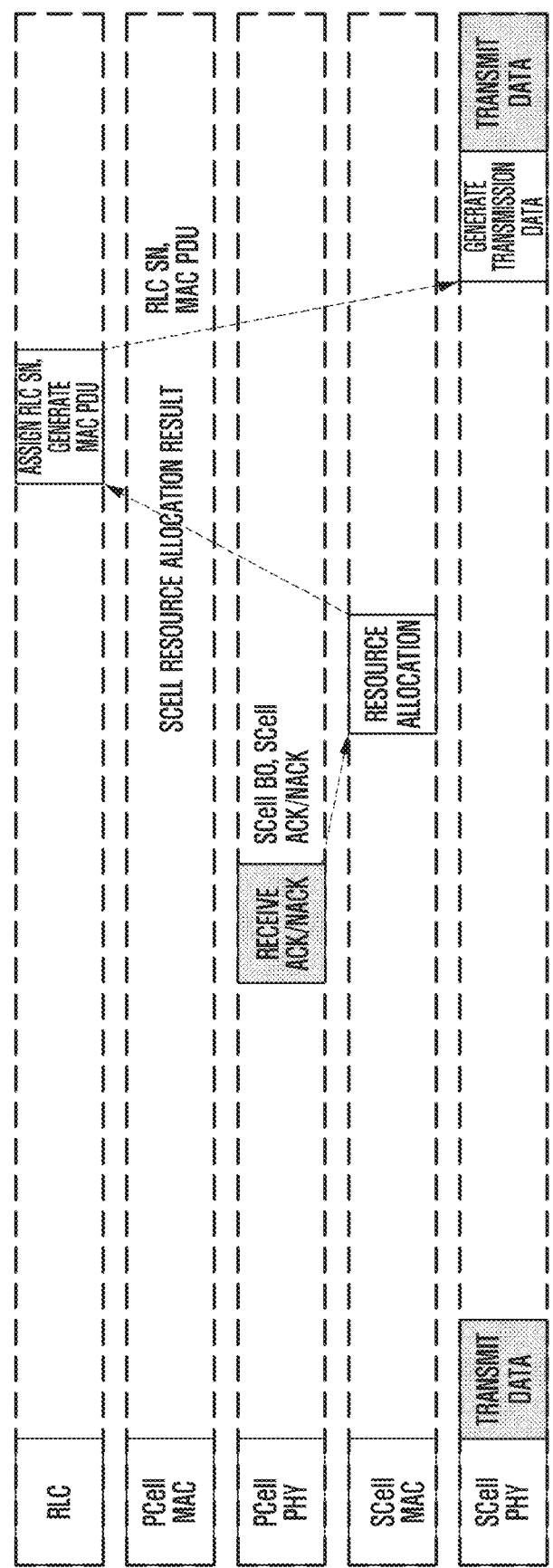
FIG. 12B is a diagram for explaining timing delay in a SCell downlink data HARQ process.
Figure 12C:
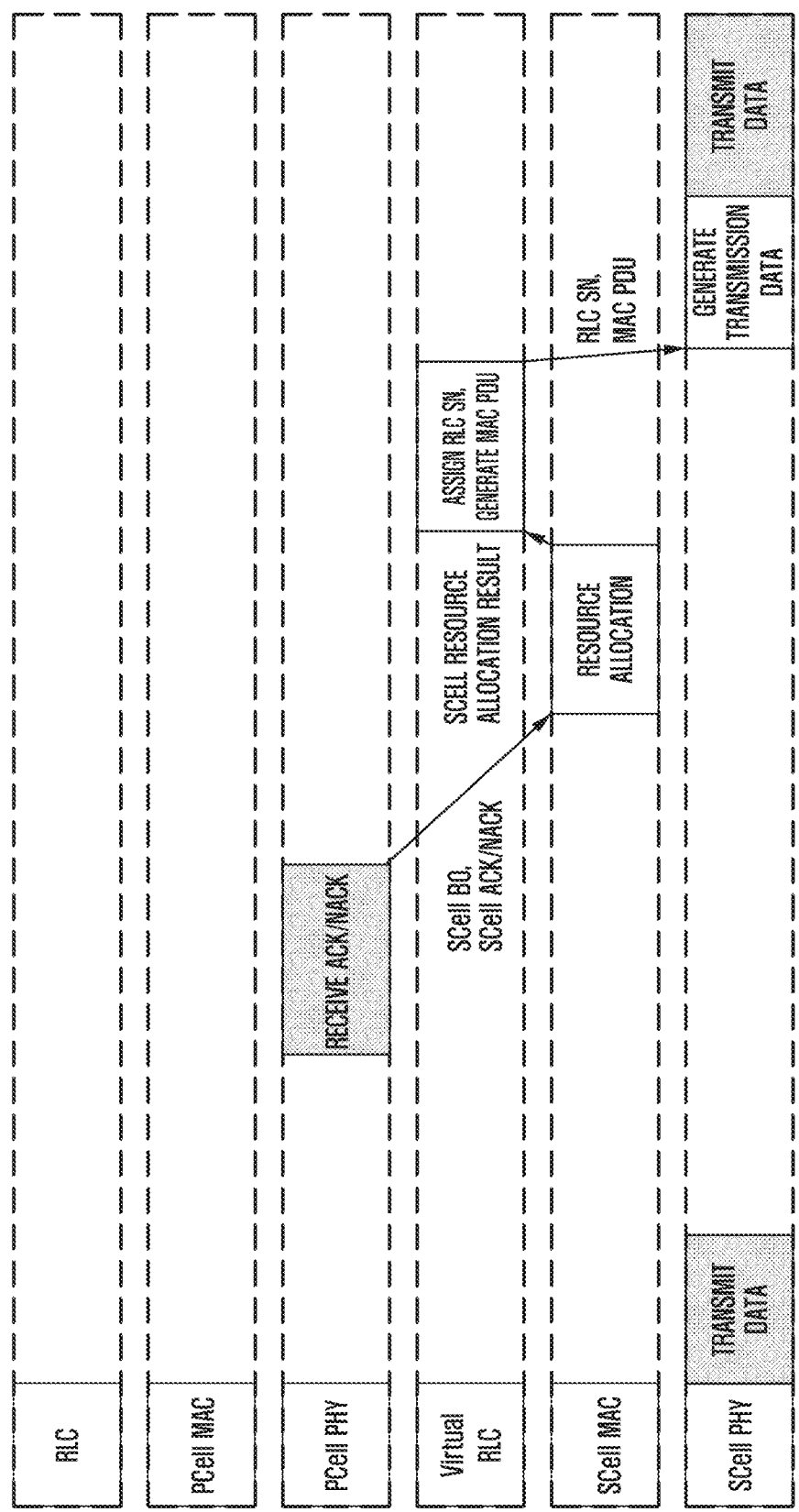
FIG. 12C is a diagram illustrating SCell downlink data HARQ process timings according to an embodiment of the present invention.

FIGS. 12A to 12C are diagrams for explaining HARQ process timings of SCell downlink data.

FIG. 12A shows a cell-specific HARQ process according to LTE standards. It may be possible to transmit data, receive a HARQ ACK/NACK corresponding to the data through PCell uplink after a predetermined time period, and perform HARQ retransmission with the same HARQ process ID or new data transmission according to the ACK/NACK result.

Accordingly, the RLC/MAC/PHY process has to be completed during a period before data transmission after the receipt of the ACK/NACK. For example, the RLC/MAC/PHY process may include ACK/NACK result delivery from PHY to MAC, resource allocation at MAC, resource allocation result transfer from MAC to RLC, RLC SN assignment and MAC PDU generation, MAC PDU transfer from RLC to PHY, and transmission data generation at PHY.

FIG. 12B shows an example of HARQ processing for SCell downlink data according to LTE standards.

If a CA technique is applied to different eNBs (i.e., PCell and SCell are hosted by different eNBs), it may be assumed that the RLC entity located in the PCell is used. Here, since the RLC entity and the MAC/PHY entities of the SCell are located at different eNBs, the eNB hosting the PCell and the eNB hosting the SCell have to perform signaling at least three times according to the RLC/MAC/PHY processing procedure described with reference to FIG. 12A. That is, it is necessary to send the ACK/NACK from the PHY of the PCell to the MAC of the SCell, send the resource allocation result from the MAC of the SCell to the RLC of the PCell, and assign RLC SNs and generate a MAC PDU at the RLC entity and send the MAC PDU from the RLC to the PHY of the SCell.

However, there are several types of latency including X2 delay between the eNBs and, if the latency increases, it may become difficult to complete the RLC/MAC/PHY process in the given time period and to use the same HARQ process ID as used in the previous transmission. This may cause HARQ process ID shortage and data allocation failure to subframes in a situation where a single UE exists in an LTE standard supporting use of up to 8 HARQ process IDs.

FIG. 12C shows an example of HARQ processing for SCell downlink data according to an embodiment of the present invention.

By applying an embodiment of the present invention to the Rel-10 CA, it may be possible for the respective eNBs to secure downlink data in advance. Accordingly, the SCell may be influenced by the inter-eNB latency caused by transmission of a resource allocation result, RLC SNs, and data in the RLC/MAC/PHY process. As a consequence, it is possible to use network resources efficiently. However, since the SCell ACK/NACK delay may still exist even though the present invention is applied, it may fail in allocating a bearer to the SCell at a corresponding time point as HARQ IDs become insufficient.

The embodiments disclosed in the specification and drawings are proposed to help explain and understand the present invention rather than to limit the scope of the present invention. Thus, the scope of the invention should be determined by the appended claims and their legal equivalents rather than the specification, and various alterations and modifications within the definition and scope of the claims are included in the claims.

What is claimed is:

1. A data transmission method of a first base station in a wireless communication system supporting carrier aggregation, the method comprising:
    identifying whether a condition for assigning data to be transmitted is fulfilled;
    determining, in a case that the condition is fulfilled, first radio link control (RLC) data and second RLC data to be assigned to the first base station and a second base station, respectively, and RLC sequence numbers associated with the second RLC data;
    transmitting, to another RLC entity in the second base station, the second RLC data and the RLC sequence numbers assigned to the second base station;
    receiving, from a user equipment (UE), acknowledgement/not-acknowledgement (ACK/NACK) information corresponding to the second RLC data; and
    transmitting, to the second base station, the ACK/NACK information corresponding to the second RLC data.

2. The method of claim 1, wherein the identifying of whether the condition for assigning data to be transmitted is fulfilled further comprises identifying whether the condition is fulfilled based on at least one of buffer occupancy information of the first base station and the second base station, latency information between the first base station and the second base station, and data rate information of the first base station and the second base station.

3. The method of claim 1, wherein the determining of the second RLC data to be assigned to the second base station further comprises determining a size of data to be assigned to the second base station based on at least one of buffer occupancy information of the first base station and the second base station, latency information between the first base station and the second base station, and data rate information of the first base station and the second base station.

4. The method of claim 1, further comprising performing terminal scheduling based on the first RLC data assigned to the first base station and RLC sequence numbers associated with the first RLC data,
    wherein the performing of the terminal scheduling further comprises processing, in a case that resource allocation error occurs in association with the first RLC data assigned to the first base station and the RLC sequence numbers associated with the first RLC data, multiple RLC sequence numbers in one subframe or one sequence number in multiple subframes.

5. A data transmission method of a second base station in a wireless communication system supporting carrier aggregation, the method comprising:
    receiving, by a radio link control (RLC) entity in the second base station, in a case that a condition for assigning data to be transmitted is fulfilled, RLC data assigned to the second base station and RLC sequence numbers associated with the RLC data from another RLC entity in a first base station;
    transmitting, to a user equipment (UE), first MAC data based on the RLC data and the RLC sequence number;
    receiving acknowledgement/not-acknowledgment (ACK/NACK) information corresponding to the first MAC data from the first base station;
    obtaining, by the RLC entity, second MAC data based on the RLC data, the RLC sequence numbers, and the ACK/NACK information; and
    transmitting, to the UE, the second MAC data to the UE.

6. The method of claim 5, further comprising:
    collecting at least one of buffer occupancy information and data rate information of the second base station; and
    sending the collected information to the first base station.

7. The method of claim 5,
    wherein whether the condition for assigning data to be transmitted is fulfilled is determined by the first base station based on at least one of buffer occupancy information of the second base station and the first base station, latency information between the second base station and the first base station, and data rate information of the second base station and the first base station, and
    wherein the RLC data and the RLC sequence numbers assigned to the second base station are determined by the first base station based on at least one of the buffer occupancy information of the second base station and the first base station, the latency information between the second base station and the first base station, and the data rate information of the second base station and the first base station.

8. The method of claim 5, further comprising:
    performing the terminal scheduling comprises processing, in a case that resource allocation error occurs in association with the RLC data assigned to the second base station and the RLC sequence numbers, multiple RLC sequence numbers in one subframe or one sequence number in multiple subframes.

9. A first base station of a wireless communication system supporting carrier aggregation, the first base station comprising:
    a communication unit configured to transmit and receive signals; and
    a controller configured to:
        control to identify whether a condition for assigning data to be transmitted is fulfilled,
        determine, in a case that the condition is fulfilled, first radio link control (RLC) data and second RLC data to be assigned to the first base station and a second base station, respectively, and RLC sequence numbers associated with the second RLC data,
        transmit, to another RLC entity in the second base station, the second RLC data and the RLC sequence numbers assigned to the second base station,
        receive, from a user equipment (UE), acknowledgement/not-acknowledgement (ACK/NACK) information corresponding to the second RLC data, and
        transmit, to the second base station, the ACK/NACK information corresponding to the second RLC data.

10. The first base station of claim 9, wherein the controller is further configured to control to identify whether the condition is fulfilled based on at least one of buffer occupancy information of the first base station and the second base station, latency information between the first base station and the second base station, and data rate information of the first base station and the second base station.

11. The first base station of claim 9, wherein the controller is further configured to control to determine a size of data to be assigned to the second base station based on at least one of buffer occupancy information of the first base station and the second base station, latency information between the first base station and the second base station, and data rate information of the first base station and the second base station.

12. The first base station of claim 9, wherein the controller is further configured to control to:
 perform terminal scheduling based on the first RLC data assigned to the first base station and RLC sequence numbers associated with the first RLC data, and
 process, in a case that resource allocation error occurs in association with the first RLC data assigned to the first base station and the RLC sequence numbers associated with the first RLC data, multiple RLC sequence numbers in one subframe or one sequence number in multiple subframes.

13. A second base station of a wireless communication system supporting carrier aggregation, the second base station comprising:
 a communication unit configured to transmit and receive signals; and
 a controller configured to control to:
  receive, by a radio link control (RLC) entity in the second base station, in a case that a condition for assigning data to be transmitted is fulfilled, RLC data assigned to the second base station and RLC sequence numbers associated with the RLC data from an RLC entity in a first base station,
  transmit, to a user equipment (UE), first MAC data based on the RLC data and the RLC sequence number,
  receive acknowledgement/not-acknowledgment (ACK/NACK) information corresponding to the first MAC data from the first base station,
  obtain, by the RLC entity, second MAC data based on the RLC data, the RLC sequence numbers and the ACK/NACK information, and
  transmit, to the UE, the second MAC data.

14. The second base station of claim 13,
 wherein the controller is further configured to control to:
  collect at least one of buffer occupancy information and data rate information of the second base station, and send the collected information to the first base station,
 wherein determining whether the condition for assigning data to be transmitted is fulfilled is determined by the first base station based on at least one of buffer occupancy information of the second base station and the first base station, latency information between the second base station and the first base station, and data rate information of the second base station and the first base station, and
 wherein the RLC data and RLC sequence numbers assigned to the second base station are determined by the first base station based on at least one of the buffer occupancy information of the second base station and the first base station, the latency information between the second base station and the first base station, and the data rate information of the second base station and the first base station.

15. The second base station of claim 13, wherein the controller is further configured to process, in a case that resource allocation error occurs in association with the RLC data assigned to the second base station and the RLC sequence numbers, multiple sequence numbers in one subframe or one sequence number in multiple subframes.

* * * * *